United States Patent
Lisenker et al.

(10) Patent No.: US 6,547,044 B2
(45) Date of Patent: Apr. 15, 2003

(54) MAGNETO-RHEOLOGICAL DAMPER WITH FERROMAGNETIC HOUSING INSERT

(75) Inventors: Ilya Lisenker, Miamisburg, OH (US); Patrick Neil Hopkins, West Carrollton, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/805,852

(22) Filed: Mar. 14, 2001

(65) Prior Publication Data

US 2002/0130000 A1 Sep. 19, 2002

(51) Int. Cl.[7] ................................. F16F 9/53
(52) U.S. Cl. ...................... 188/267.2; 188/267
(58) Field of Search .................. 188/267.1, 267, 188/322.22, 267.2; 267/140.14

(56) References Cited

U.S. PATENT DOCUMENTS

| | | |
|---|---|---|
| 5,277,281 A | 1/1994 | Carlson et al. |
| 5,678,808 A | 10/1997 | Claude et al. |
| 5,878,851 A | 3/1999 | Carlson et al. |
| 5,947,238 A * | 9/1999 | Jolly et al. ............... 188/267.2 |
| 5,984,060 A | 11/1999 | Clark et al. |
| 6,151,930 A * | 11/2000 | Carlson ..................... 68/12.06 |

FOREIGN PATENT DOCUMENTS

WO       WO 98/00653       1/1998

* cited by examiner

Primary Examiner—Jack Lavinder
Assistant Examiner—C. T. Bartz
(74) Attorney, Agent, or Firm—Scott A. McBain

(57) ABSTRACT

A magneto-rheological ("MR") damper having a damper body tube containing an MR fluid. A piston assembly is disposed in the damper body tube and forms an annular flow gap between the piston assembly and the damper body tube. The piston assembly has a piston core containing ferrous material and an electromagnetic coil mounted on the piston core for generating a magnetic field. The damper further includes a ferromagnetic member positioned outside of the damper body tube substantially adjacent the piston assembly for providing at least a part of a magnetic flux return path for the magnetic field.

9 Claims, 2 Drawing Sheets

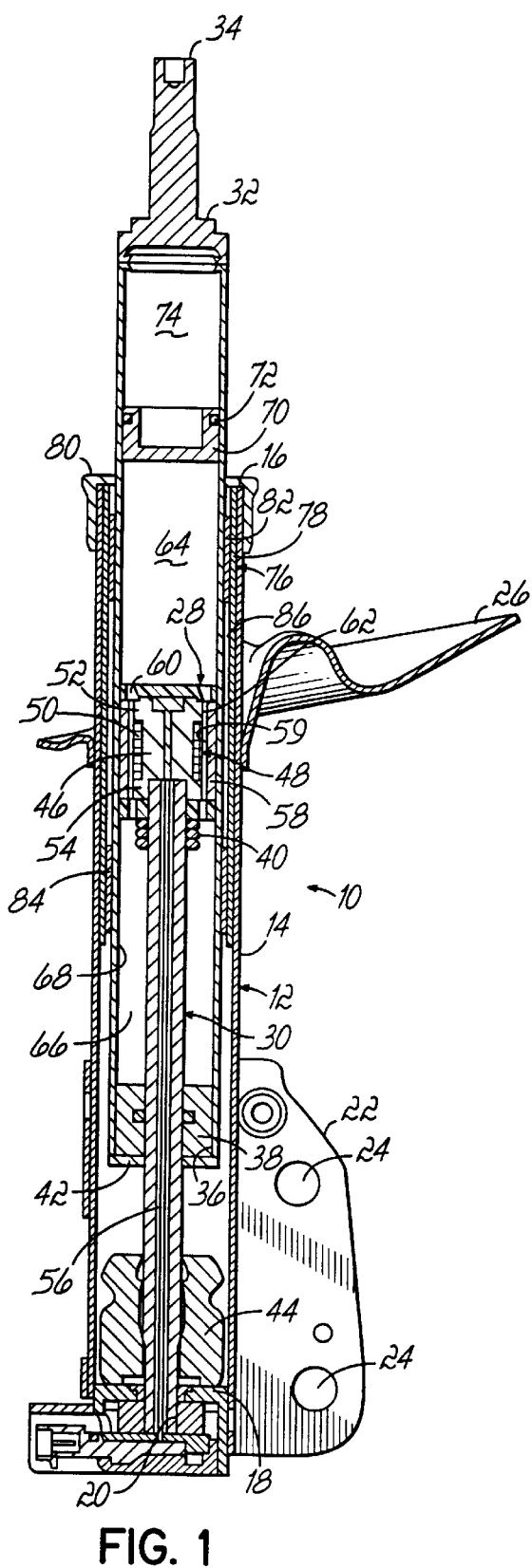
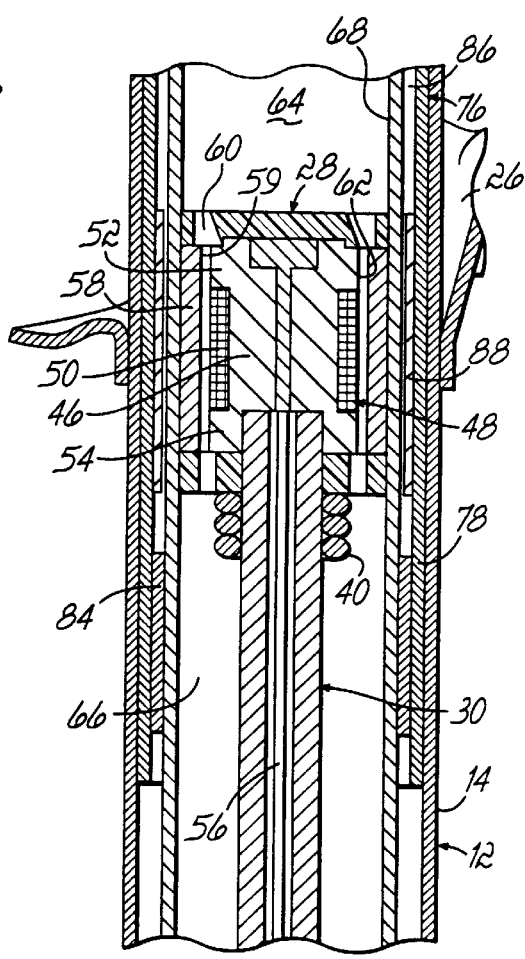
FIG. 1
FIG. 2

MAGNETO-RHEOLOGICAL DAMPER WITH FERROMAGNETIC HOUSING INSERT

FIELD OF THE INVENTION

The present invention relates to a magneto-rheological (MR) fluid damper, and more particularly, to a linearly-acting MR fluid damper suitable for vibration damping in a vehicle suspension system.

BACKGROUND OF THE INVENTION

MR fluids are materials that respond to an applied magnetic field with a change in rheological behavior (i.e., change in formation and material flow characteristics). The flow characteristics of these non-Newtonian MR fluids change several orders of magnitude within milliseconds when subjected to a suitable magnetic field. In particular, magnetic particles noncolloidally suspended in fluid align in chain-like structures parallel to the applied magnetic field, changing the shear stress on adjacent shear surfaces.

Devices such as controllable dampers benefit from the controllable shear stress of MR fluid. For example, linearly-acting MR fluid dampers are used in vehicle suspension systems as vibration dampers. At low levels of vehicle vibration, the MR fluid damper lightly damps the vibration, providing a more comfortable ride, by applying a low magnetic field or no magnetic field at all to the MR fluid. At high levels of vehicle vibration, the amount of damping can be selectively increased by applying a stronger magnetic field. The controllable damper lends itself to integration in vehicle suspension systems that respond to vehicle load, road surface condition, and driver preference by adjusting the suspension performance.

MR fluid dampers are based on a piston assembly moving within a damper body tube providing a reservoir of MR fluid. As the piston assembly translates within the damper body tube, MR fluid is allowed to move around or through the piston assembly in a flow gap to the opposite portion of the damper body tube. A magnetic field passing across the flow gap changes the viscosity of the MR fluid in the flow gap. The flow gap thus provides shear surfaces to react to the viscosity of the MR fluid to provide damping.

Increasing the damping performance of the MR fluid damper depends in part upon concentrating the magnetic field at the flow gap. To that end, conventionally, the piston assembly includes a generally cylindrical piston core having an annular recess holding a magnetic coil. The magnetic field from the coil is concentrated at the axially opposing flux pole pieces of a piston core at each end of the flow gap. A magnetic circuit is completed by a magnetic flux return path coupled to each flux pole piece.

Efficiently concentrating the magnetic field at the flow gap requires, in part, an efficient magnetic flux return path. With some MR fluid damper designs, a "soft" magnetic material is used to encompass the piston assembly in order to conduct the magnetic field. Low carbon steel is an example of soft magnetic material. One beneficial feature of soft magnetic material is that it conducts magnetic flux better than "hard" magnetic material.

Conventional MR fluid dampers utilizing soft magnetic material in the magnetic flux return path have various problems. For example, in some MR fluid dampers, a magnetic flux return path is provided by a damper body tube composed of a soft magnetic material such as a low carbon steel. The wall thickness of the damper body tube must be sufficient to avoid magnetic saturation at the higher damping levels. Magnetic saturation occurs when the required damping dictates a magnetic field that exceeds the maximum magnetic field that can be conducted by the wall of the damper tube body. Therefore, greater damping capacity requires a thicker damper tube body wall.

In an MR fluid damper, the damping action occurs by forcing the MR fluid through a flow gap formed between the piston assembly and the wall of the damper body tube. Thus, for a given damper diameter, increasing the wall thickness of the damper body tube reduces the size, and hence, the damping capability, of the piston assembly. Further, the increased amount of steel in the thicker damper body tube increases manufacturing costs and damper weight.

With other MR fluid damper designs, a magnetic flux return path is provided by a ferromagnetic flux ring surrounding the piston core. With these designs, a flow gap passes axially through, rather than around, the piston assembly. Consequently, a relatively thin-walled damper body tube may be made of a material that is not expected to contribute to the magnetic flux return path. Unfortunately, for a given diameter MR fluid damper relying upon a flux ring, the flow gap is moved inward toward the center of the damper body tube, thereby reducing the available shear surface area and hence, the damping capability. MR fluid dampers with flux rings require a structure to hold the flux ring about the piston core. These structures also block part of the available flow path, reducing damping capability. In addition, the cross-sectional area available for the piston core is reduced, decreasing the total amount of magnetic flux that can be conducted around the magnetic circuit, yet further reducing damping capability. As a compromise, some MR fluid dampers use a piston assembly with a thin flux ring, and the magnetic field return path relies on both the thin flux ring and the wall of the damper body tube. Consequently, thin flux ring MR fluid dampers also have problems as do dampers utilizing either a thick flux ring or no flux ring.

Consequently, there is a need for an MR fluid damper with a magnetic field return path that does not saturate with higher damping requirements, does not unnecessarily limit the damping capacity and does not substantially increase the cost or weight of the MR fluid damper.

SUMMARY OF THE INVENTION

The present invention provides an MR fluid damper with increased performance. The MR fluid damper of the present invention provides a desired magnetic flux return path without increasing the wall thickness of the damper body tube or changing the location of the flow gap. Thus, the desired magnetic flux return path is provided without adversely influencing the function of any other component of the MR fluid damper or diminishing its damping capacity.

According to the principles of the present invention and in accordance with the described embodiment, the present invention provides a magneto-rheological ("MR") damper having a damper body tube containing an MR fluid. A piston assembly is disposed in the damper body tube and forms an annular flow gap between the piston assembly and the damper body tube. The piston assembly has a piston core containing ferrous material and an electromagnetic coil mounted on the piston core for generating a magnetic field. The damper further includes a ferromagnetic member positioned outside of the damper body tube substantially adjacent the piston assembly for providing at least a part of a magnetic flux return path for the magnetic field. The use of a separate member to provide an additional (or parallel) magnetic flux return path permits increased damping performance without substantially increasing the cost or weight of the MR fluid damper.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

FIG. 1 is a cross section view of a magneto-rheological (MR) fluid damper.

FIG. 2 is an enlarged cross section view of a portion of the MR fluid damper of FIG. 1 surrounding the piston assembly.

DETAILED DESCRIPTION OF THE INVENTION

Figure 3:
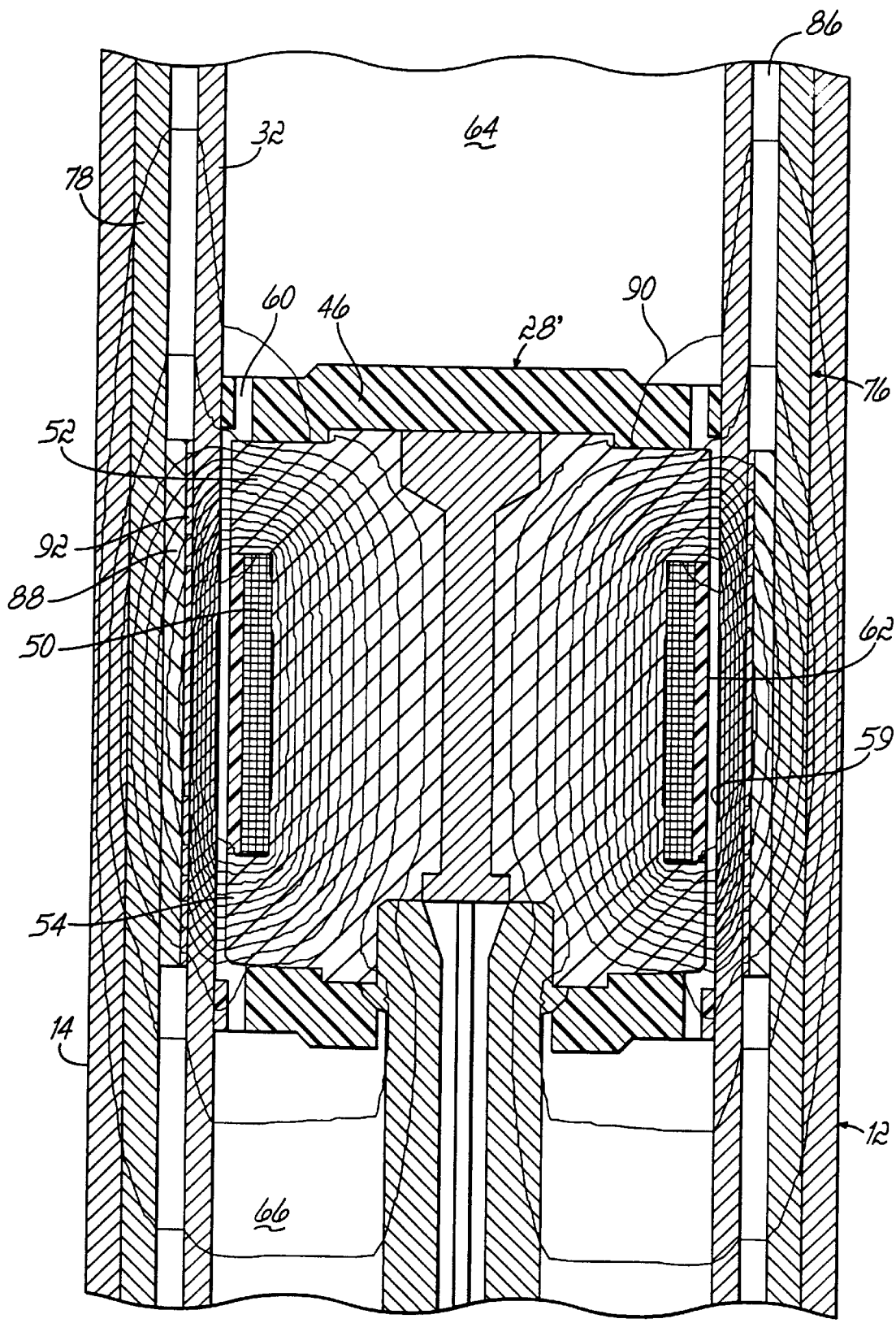
FIG. 3 is an enlarged cross section view of an alternative bearing system for the MR fluid damper of FIG. 1.

FIG. 1 illustrates a linearly-acting magneto-rheological (MR) fluid damper and in particular, a monotube gas-charged suspension strut 10. In general, the strut 10 is designed for operation as a load-bearing and shock-absorbing device within a vehicle suspension system, and is connected between the sprung (body) and unsprung (wheel assembly) masses (not shown). The strut 10 comprises a housing 12 that includes a housing tube 14 with an open end 16 and a closed end 18. The closed end 18 includes an opening 20. A mounting bracket 22 near the closed end 18 is secured in position by a suitable means such as welding. The mounting bracket 22 has suitable openings 24 for connection to the unsprung mass of the vehicle at a location such as the steering knuckle (not illustrated). A spring seat 26 is also received on the housing tube 14 and is positioned as required by the particular application within which the strut 10 will operate. The spring seat 26 is fixed in position on the housing tube 14 by a suitable means such as welding.

A piston assembly 28 is connected to a hollow piston rod 30 and is fixed in position within the housing tube 14. The piston rod 30 extends through the opening 20.

The strut 10 further includes a damper body tube 32 that is slidingly received over the piston assembly 28. The damper body tube 32 includes a first end 34 at an outboard position adapted to be connected to the sprung mass of the vehicle and includes a second end 36 at an inboard position. The second end 36 is supported about the piston rod 30 by a rod guide assembly 38 that is fixed in position within the damper body tube 32. At maximum extension of the strut 10, a rebound bumper 40 on the bottom of the piston assembly 28 is compressed against the rod guide assembly 38 to cushion the deceleration of the strut 10. At maximum compression of the strut 10, a bottom plate 42 at the second end 36 of damper body tube 32 is adapted to contact a jounce bumper 44 that comprises an elastomeric bushing that is positioned against the closed end 18 of housing tube 14 and about the piston rod 30.

The piston assembly 28 inside the damper body tube 32 includes a piston core 46 mounted on one end of piston rod 30 and formed of a ferromagnetic material. The piston assembly 28 further includes a magnet assembly 48 including a coil 50 mounted on piston core 46 to form flux pole pieces 52, 54 positioned on each axial end of the coil 50. The coil 50 is connected to an electrical source (not shown) via an electrical connector 56 extending through piston rod 30. The magnet assembly 48 also includes an annular flux ring 58 positioned around piston core 46 to form an annular flow gap 60 between the inner annular surface 59 of the flux ring 58 and an outer surface 62 of piston core 46 and coil 50. The piston assembly 28 divides the volume of MR fluid within the damper body tube 32 into a compression chamber 64 and an extension chamber 66.

If, for example, the damper body tube 32 moves upward relative to the piston assembly 28, the MR fluid flows from extension chamber 66, through flow gap 60 and into compression chamber 64. The flux ring 58 is designed with an outer diameter size to form a sliding fluid seal with an inner surface 68 of damper body tube 32. Therefore, as the damper body tube 14 slides over flux ring 58, MR fluid does not leak past the flux ring 58.

The MR fluid within damper body tube 32 is a conventional MR fluid that has magnetic particles such as iron or iron alloys. The magnetic particles are controllably suspended within the fluid by controlling a magnetic field through the flow gap 60. Thus, a desired damping effect between the sprung and unsprung masses of the vehicle is achieved by controlling the application of an electric current to coil 50 in order to vary the magnetic field and hence, the flow characteristics of the MR fluid in the flow gap 60.

A gas cup 70 is also carried in the damper body tube 32 between the piston assembly and the end. The gas cup 70 carries a dynamic seal 72 and slides along the inner surface 68 of damper body tube 32, separating a compensation chamber 74 from the compression chamber 64. While the extension chamber 66 and compression chamber 64 carry a supply of MR fluid, the compensation chamber 74 carries a compressible nitrogen gas supply. During extension and compression directed travel of the damper body tube 32 relative to the piston assembly 28, a decreasing or an increasing volume of the piston rod 30 is contained within the damper body tube 32 depending on the stroke position of the strut 10. In order to compensate for this varying volumetric amount of the piston rod 30 within the fluid-filled chambers 64, 66, the gas cup 70 slides, compressing or expanding the compensation chamber 74.

The predominate means of supporting the damper body tube 32 within the housing tube 14 is provided by a bearing system 76. The bearing system 76 includes a bearing sleeve 78 slip-fit near the open end 16 of the housing tube 14. The bearing sleeve 78 is maintained in position by a retaining cap 80 that is pressed onto the open end 16 of housing tube 14. The bearing system 76 also includes a pair of plain bearings 82, 84 that are fixed by a press-fit within the bearing sleeve 78. A fluid-tight chamber 86 is formed between the bearings 82, 84 which is filled with a lubricating oil. The bearings 82, 84 contact the damper body tube 32 and guide linear motion of the damper body tube 32 with respect to the piston assembly 28.

Referring to FIG. 2, an enlarged cross section view of the bearing system 76 shows a sleeve 88 made of a ferromagnetic material, for example, a low carbon steel, disposed within the housing tube 14. In particular, the ferromagnetic sleeve 88 is fixed within the bearing sleeve 78, for example by a press-fit, adhesive, or other known means. The ferromagnetic sleeve 88 is registered with, that is, is located immediately adjacent to, the piston assembly 28. The sleeve 88 is normally secured in that position by the friction of the press-fit; however, as will be appreciated, the sleeve 88 may be fixed in its desired position by other known means, for example, welding, adhesives, fasteners, etc. The ferromagnetic sleeve 88 effectively increases the wall thickness of the damper body tube 32 only immediately adjacent the piston assembly 28. Thus, the ferromagnetic sleeve 88 provides a desired magnetic field return path without having to increase the thickness of the damper body tube 32 itself or change the location of the flow gap 60.

In one alternative embodiment, the flux ring 58 of FIG. 2 can be eliminated; and a magnetic field return path provided as shown in FIG. 3. A magnetic return path 90 passes through the damper body tube 32, damper body tube 32, ferromagnetic sleeve 88, bearing sleeve 78 and housing tube 14. In particular, the ferromagnetic sleeve 88 enhances the magnetic return path 90, compensating for the corresponding reduction in material in the magnetic flux return path 90 of having no flux ring 58. Consequently, the increased performance of a larger flow gap 60 adjacent to the housing tube 14 may be realized without a weight penalty of a thick housing tube 14.

Although piston assembly 28' is depicted as laterally supported by two bearing plates at each end of the piston core 46, it should be appreciated that the piston assembly 28' may be laterally supported by an interrupted bearing in the flow gap 60 or only one bearing plate.

In another alternative embodiment, one of the bearings, for example, bearing 82, is constructed of a thin layer of bearing material on a soft steel base. The bearing 82 is then press-fit within the bearing sleeve 78 to an axial position registered with, that is, immediately adjacent, the piston assembly 28. With this embodiment, the ferromagnetic bearing 82 functions as a magnetic flux return path. Therefore, with this embodiment, a separate ferromagnetic sleeve 88 and its associated assembly step is eliminated.

In use, referring to FIG. 1, a linearly-acting magneto-rheological (MR) fluid damper, such as a strut 10, includes a ferromagnetic member, such as a sleeve 88, that is located outside the damper body tube 40 at an axial position adjacent the piston assembly 28. Referring to FIGS. 2 and 3, an electric current is applied to the coil 50 that is representative of the desired damping effect between the sprung and unsprung masses of the vehicle. The electric current creates a magnetic field that sets the flow characteristics of the MR fluid in the flow gap 60, thereby providing the desired damping effect between the sprung and unsprung masses of the vehicle. The magnetic field has a return path through the ferromagnetic member, for example, the sleeve 88, that is independent of the damper body tube 32.

The MR fluid damper 10 having the ferromagnetic sleeve 88 can be designed to provide the desired magnetic flux return path without adversely influencing the cost or performance of other components of the MR fluid damper 10 or diminishing its damping capacity. Thus, the MR fluid damper 10 of the present invention has increased performance and without a substantial increase in cost or weight.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, struts 10 consistent with aspects of the invention may be based on a twin tube cylindrical reservoir having an outer tube surrounded by a ferromagnetic member. Further, the invention may also be applied to shock absorbers.

What is claimed is:

1. A magneto-rheological ("MR") fluid damper comprising:
   a damper body tube containing an MR fluid;
   a piston assembly disposed in the damper body tube to form an annular flow gap between the piston assembly and the damper body tube, the piston assembly comprising
      a piston core containing ferrous material and an electromagnetic coil mounted on the piston core for generating a magnetic field, and
      a flux ring surrounding and operatively coupled to the piston core to form the annular flow gap with the piston core, the flux ring being in sealing, sliding contact with an inner surface of the damper body tube; and
   a ferromagnetic member operatively positioned outside of the damper body tube substantially adjacent the piston assembly for providing at least a part of a magnetic flux return path for the magnetic field, the ferromagnetic member operatively cooperating with the flux ring to strengthen the magnetic field passing through the annular flow gap.

2. The MR fluid damper of claim 1 further comprising a housing tube receiving the damper body tube and the ferromagnetic member, the damper body tube being movable relative to the housing tube and the ferromagnetic member.

3. The MR fluid damper of claim 2 further comprising a bearing sleeve and the ferromagnetic member is a sleeve press-fit inside the bearing sleeve.

4. The MR fluid damper of claim 3 wherein the ferromagnetic member is constructed of a thin layer of bearing material on a soft steel base, the ferromagnetic member contacting and guiding motion of the damper body tube.

5. A magneto-rheological ("MR") fluid damper comprising:
   a housing;
   a damper body tube containing an MR fluid and disposed in the housing and is movable relative to the housing;
   a piston assembly disposed in the damper body tube to form an annular flow gap between the piston assembly and the damper body tube, the piston assembly comprising a piston core containing ferrous material and an electromagnetic coil mounted on the piston core for generating a magnetic field; and
   a ferromagnetic member operatively coupled to the housing outside of the damper body tube and substantially adjacent the piston assembly for providing at least a part of a magnetic flux return path for the magnetic field.

6. The MR fluid damper of claim 5 wherein the ferromagnetic member comprises a ferromagnetic member operatively coupled to the housing by insertion between the housing and the damper body tube.

7. The MR fluid damper of claim 6 wherein the piston assembly includes a piston rod connected to the housing whereby the piston assembly is stationary with respect to the ferromagnetic member.

8. The MR fluid damper of claim 7 wherein the ferromagnetic member is axially sized and aligned to correspond to the piston core.

9. The MR fluid damper of claim 5 wherein the ferromagnetic member comprises a bearing surface slidingly contacting the damper body tube.

* * * * *